(12) United States Patent
Konno et al.

(10) Patent No.: US 6,450,274 B1
(45) Date of Patent: *Sep. 17, 2002

(54) CONTROL DEVICE FOR A HYBRID VEHICLE

(75) Inventors: Fumihiko Konno; Shigetaka Kuroda; Youichi Iwata; Asao Ukai; Takashi Kiyomiya; Kenji Nakano; Atsushi Matsubara, all of Wako; Yasuo Nakamoto, Tochigi, all of (JP)

(73) Assignee: Honda Giken Kogyo Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/395,984

(22) Filed: Sep. 15, 1999

(30) Foreign Application Priority Data

Sep. 18, 1998 (JP) ............................................. 10-303149

(51) Int. Cl.[7] ................................................. B60K 1/00
(52) U.S. Cl. ...................... 180/65.3; 190/65.2; 190/309
(58) Field of Search ............................... 180/65.2, 65.4, 180/309, 65.3; 290/40 A, 40 C, 40 R; 60/300; 123/2

(56) References Cited

U.S. PATENT DOCUMENTS

| 4,021,677 | A | * | 5/1977 | Rosen et al. ............... 290/40 R |
| 5,345,761 | A | * | 9/1994 | King et al. .................... 60/274 |
| 5,785,137 | A | * | 7/1998 | Reuyl ........................ 180/65.2 |
| 5,865,263 | A | * | 2/1999 | Yamaguchi et al. ........ 180/65.2 |
| 6,032,753 | A | * | 3/2000 | Yamazaki et al. ......... 180/65.3 |
| 6,057,605 | A | * | 5/2000 | Bourne et al. ............ 290/40 C |

* cited by examiner

Primary Examiner—Robert P. Olszewski
Assistant Examiner—James S. McClellan
(74) Attorney, Agent, or Firm—Arent Fox Kintner Plotkin & Kahn, PLLC

(57) ABSTRACT

A control device for a hybrid vehicle powered from an engine and an assist motor for supplying electric power in an amount predetermined according to running conditions of the vehicle further includes means for detecting a catalyzer temperature and correcting the predetermined assist power value according to the detected catalyzer temperature when accelerating and means for preventing the idling engine from being cut off when detected catalyzer temperature is lower than a preset temperature. This control device thus realizes rapid heating of the catalyzer device to a temperature necessary for activating the catalyzer therein by adequately correcting the assist power value of the motor according to the current catalyzer temperature when accelerating and by preventing the idling engine from being cut off while the catalyzer device has a low temperature.

3 Claims, 5 Drawing Sheets

CONTROL DEVICE FOR A HYBRID VEHICLE

BACKGROUND OF THE INVENTION

The present invention relates to a control device for a hybrid vehicle powered from an engine and an assist motor for assisting the engine.

A typical hybrid vehicle is usually powered by its engine and, during acceleration, is additionally powered by an assist motor output of which is uniformly predetermined according to current conditions of the vehicle.

Thus, a conventional control means for the hybrid vehicle causes the assist motor to work by supplying always a uniformly determined power to help the engine even when the catalyzer device for cleaning exhaust gas from the engine is not warmed up to a temperature necessary for activating a catalyzer therein.

Furthermore, the hybrid vehicle is provided with control means that usually stops the engine for its idling time to save fuel consumption and restarts the engine when restarting the vehicle.

Consequently, the hybrid vehicle may cut off the idling engine with the catalyzer device being inactive at a low temperature.

The problems involved in the control system of the conventional hybrid vehicle powered by a combination of an engine with an assist motor are such that the control causes the assist motor to help the engine when the catalyzer device for cleaning exhaust gas from the engine is inactive at a low temperature and causes the idling engine to stop with the catalyzer device being in inactive state. In such cases, it requires much time to warm the catalyzer device to the working temperature necessary for cleaning exhaust gas from the engine.

SUMMARY OF THE INVENTION

Accordingly, a primary object of the present invention is to provide a control device for a hybrid vehicle, which device controls an assist motor to supply electric power to a main engine when accelerating the vehicle and which includes means for detecting a temperature of a catalyzer device and correcting a predetermined assist power value, when a current temperature of the catalyzer device is lower than a specified temperature so that the catalyzer therein can be rapidly activated by heat.

Another object of the present invention is to provide a control device for a hybrid vehicle powered by a combination of a main engine and an assist motor, which detects a temperature of a catalyzer device and, when the detected temperature of the catalyzer device is lower than a specified value, prohibits the engine to stop idling so as to immediately heat the catalyzer device to the temperature at which catalyzer therein actively work for cleaning the engine exhaust gas.

DETAILED DESCRIPTION OF PREFERRED EMBODIMENTS

Figure 1:
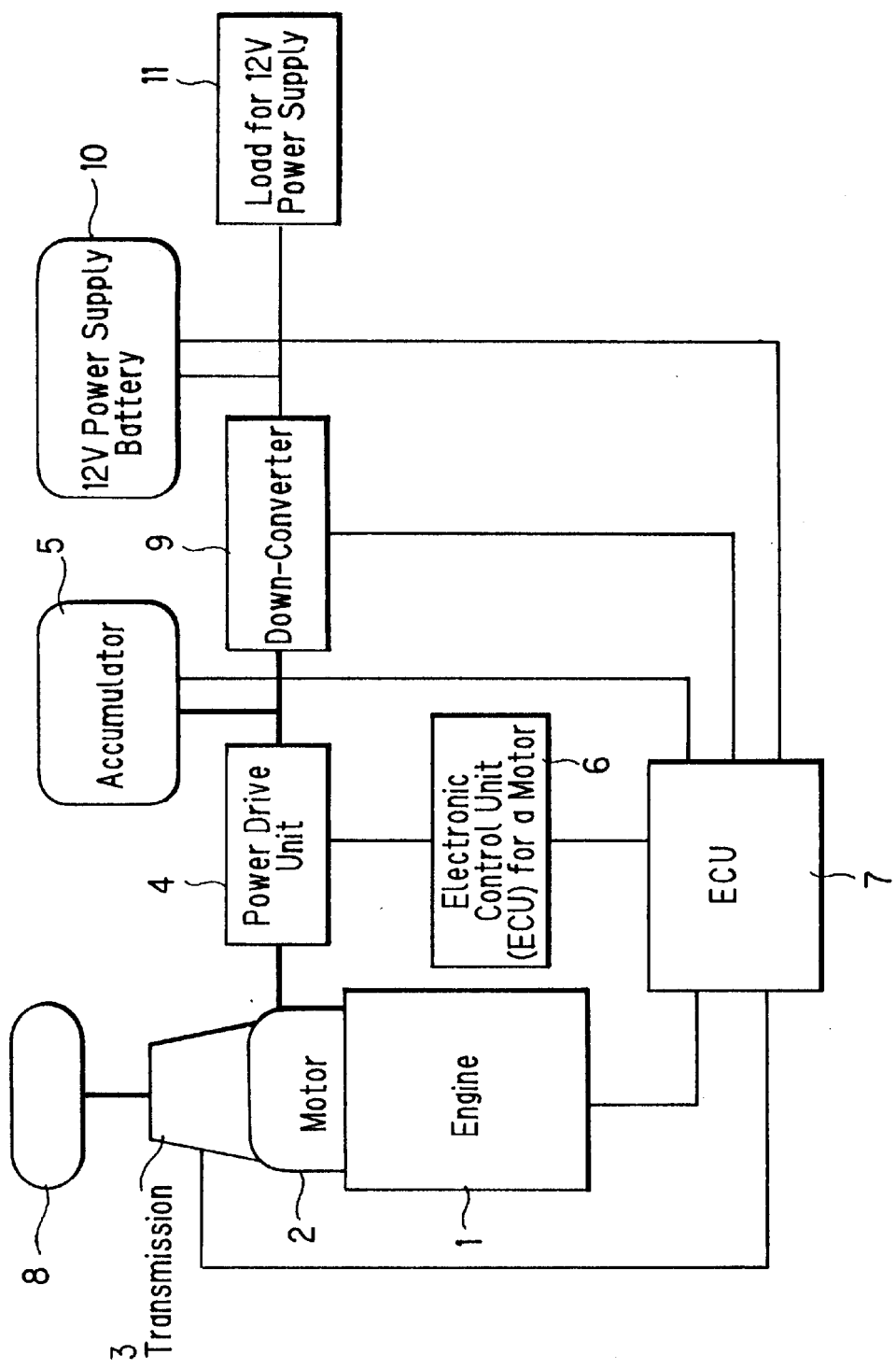
FIG. 1 is a construction block diagram of an exemplified system of a hybrid vehicle according to the present invention.

A system construction of a hybrid vehicle is shown in FIG. 1. The system includes driving arrangements composed of an engine 1, an engine-assist motor 2, a transmission 3, a power drive unit 4 for driving the motor and an accumulator 5 for supplying electric power to the motor and includes control arrangements composed of an electronic control unit ECU6 for conducting the control of the operation of the motor and energy regeneration of the motor through the power drive unit 4 and a central electronic control unit ECU7 for conducting a centralized control of the entire system. In FIG. 1, numeral 8 designates driving wheels of the vehicle.

The electronic control unit ECU7 reads signals from sensors for detecting running parameters of the vehicle, determines the current running state of the vehicle and selects one of the motor operation modes, i.e., starting mode, idling stopping mode, idling mode, acceleration assisting mode, cruising mode and regenerative decelerating mode. The control unit ECU7 gives a mode instruction to the electronic control unit ECU6 that in turn performs the operation for stopping or driving the assist motor 2 via the power drive unit 4 and/or regenerative deceleration using the motor 2.

The control unit ECU7 controls the down-converter 9 to reduce an output voltage of the accumulator 5 to a specified value (12V) to charge a 12-volt power-supply battery 10 which load is shown by a reference numeral 11 in FIG. 1.

Figure 2:
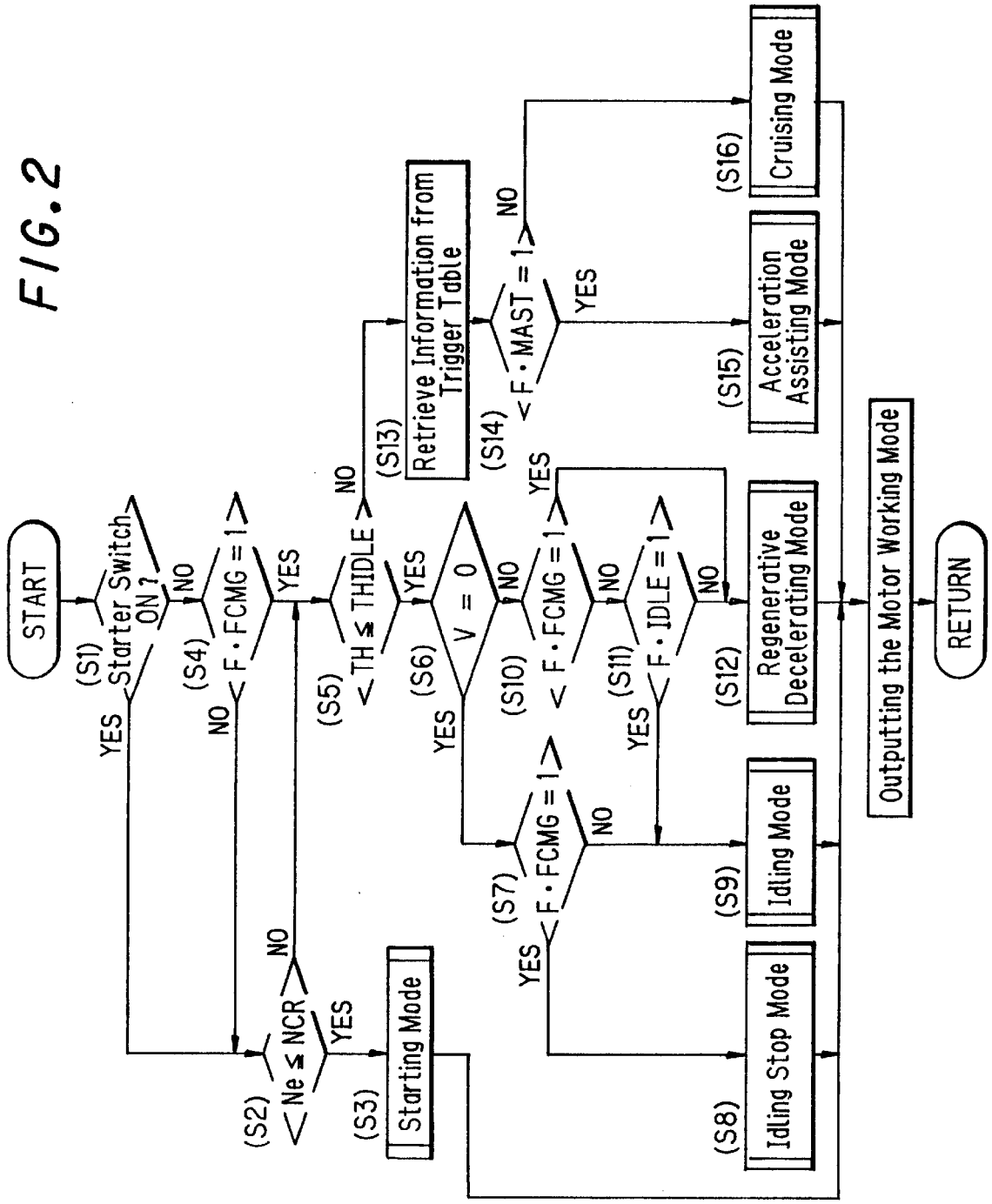
FIG. 2 is a flowchart depicting a procedure for setting a working mode of an assist motor according to running conditions of a vehicle.

FIG. 2 is a flowchart depicting a procedure of setting an operation mode of the motor 2 according to a running state of the vehicle.

The control unit ECU7 examines whether a starter switch has been turned ON (Step S1) and, if so, examines whether the detected number of revolutions Ne of the engine is not more than a specified value NCR preset for judging the need of stopping the engine (Step S2). If Ne≦NCR, the control unit ECU7 sets a starting mode (Step S3).

If the starter is not in the ON position, the control unit ECU7 examines whether a Flag F·FCMG is set in the state <1> to indicate the need for stopping the engine being idling (Step S4). If the flag is not set, the control unit returns to Step S2.

With the flag F·FCGM found in the state <1> at that time, the control unit ECU7 examines whether a detected degree TH of opening of a throttle corresponds to a full-closed value THIDLE (Step S5).

If TH≦THIDLE, then the control unit ECU7 judges whether a speed V of the vehicle is equal to zero (Step S6). With the speed V being equal to zero, the control unit ECU7 examines whether the Flag F·FCMG is in the state <1> (Step S6). With the flag F·FCMG being set, the control unit ECU7 selects the idling stop mode (Step S9). If the flag is not set in the state <1>, the control unit selects the idling mode (Step S7).

If the speed V is not equal to zero (at Step S6), then the control unit ECU7 examines whether the flag F·FCMG is set in the state <1> (Step S10). With the flag F·FCMG being in the state <1>, the control unit ECU7 selects the regenerative deceleration mode (Step S12). If not, the control unit ECU7 examines whether a Flag F·IDLE is set in the state <1> indicating the idling of the engine (Step S11). If so, the control unit ECU7 selects the idling mode (Step S9). If not, the control unit selects the regenerative deceleration mode (Step S12).

When TH is larger than THIDLE at Step S5, the control unit ECU7 retrieves information from a predetermined assist-trigger table to discriminate which is the current state of the vehicle—being accelerated or cruising (Step S13).

Figure 3:
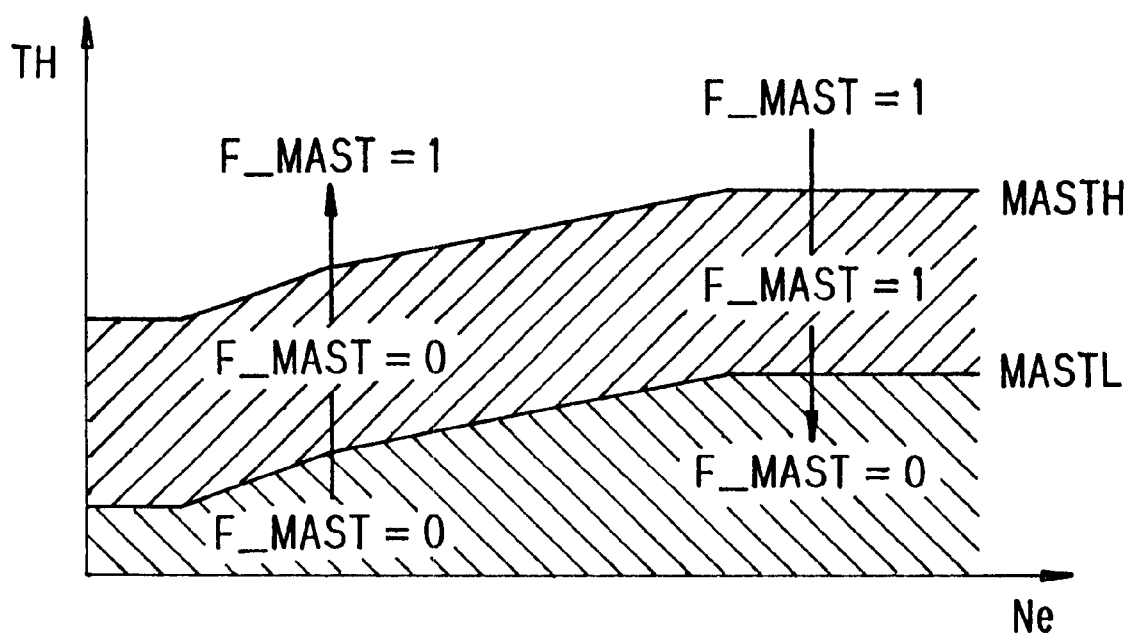
FIG. 3 is a graph showing a content of an assist trigger table, which characteristics are set for respective transmission gear positions.

FIG. 3 shows a content of an assist-trigger table, which is preset for each gear position. In the table, acceleration assisting made flag F·MAST changes its state from zero to one when the throttle opening degree TH exceeds a predetermined higher-threshold MASTH in the case the value TH increases with a decrease of engine revolutions per minute Ne, while the flag F·MAST changes its state from one to zero when the throttle opening degree TH decreases less than a predetermined lower-threshold MASTL in the case the value TH decreases with an increase of the value Re.

The control unit ECU7 examines whether the acceleration-assisting mode flag F·MAST is set in state <1> (Step S14). If so, the control unit selects the acceleration assisting mode (Step S15). If not, the control unit selects the cruising mode (Step S16).

After selection of the operation mode of the motor 2, the control unit ECU7 gives the motor control unit ECU6 an instruction to execute the designated operation mode of the motor (Step S17).

Thus, the same procedure will be repeated.

According to the present invention, the control unit ECU7 includes means for detecting a temperature of a catalyzer device for cleaning exhaust gases from the engine and means for correcting the predetermined assist-power value by reducing the value at a specified rate according to a concurrently detected temperature of the catalyzer when determining an assist power value for acceleration according to the current running state of the vehicle powered by the engine and the motor in the acceleration assisting mode.

Figure 4:
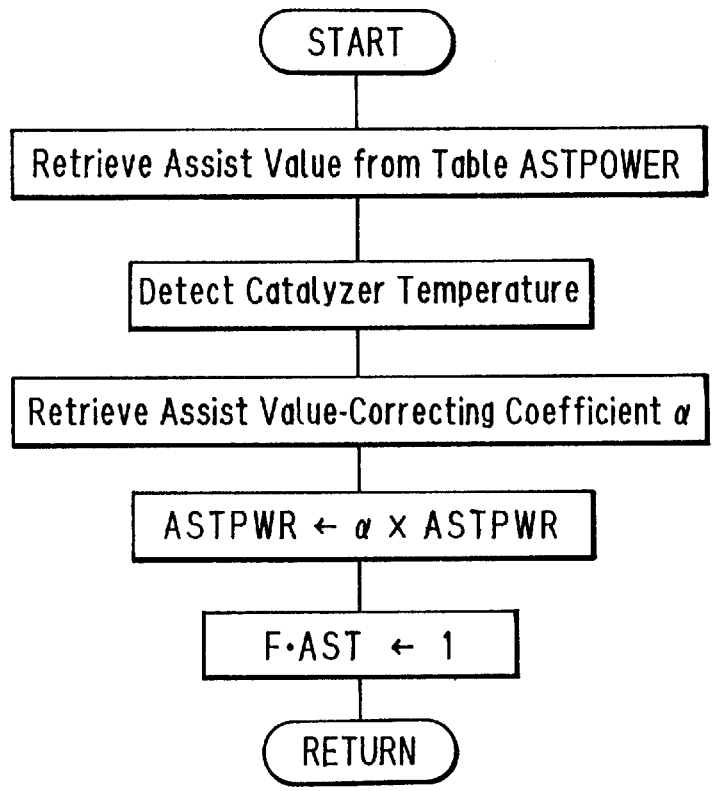
FIG. 4 is a flowchart depicting a procedure for determining an assist power value according to current running conditions of a vehicle when accelerating the vehicle and correcting a predetermined assist power value according to the temperature of the catalyzer.

FIG. 4 is a flowchart depicting the procedure of determining an assist-power value according to the current running state of the vehicle when using the motor in the acceleration assisting mode and correcting the determined assist-power value according to the catalyzer temperature detected at the same time.

In Step S21, the control unit ECU7, referring to a map ASTPWR, determines an assist-power value ASTPWR in accordance with the current state of the vehicle.

Table 1 shows a content of the ASTPWR map, which is preset for respective gear positions of transmission 3 of manual operation type (MT) or automatic type (AT) according to engine revolutions per minute and throttle opening degrees.

In this map, there are used 20 levels of engine speeds NEAST0–NEAST19 and 11 levels of throttle opening degrees THAST0–THAST10. For example, an assist power-power value is determined as ASTPWR#n1.1 when a detected engine revolution value is of the level NEAST1 and the detected throttle opening degree is of the level THAST1.

TABLE 1

|  | NEST0 | NEAST1 | ... | NEAST19 |
|---|---|---|---|---|
| THAST0 | ASTPWR#n00 | ASTPWR#n10 | ... | ASTPWR#n190 |
| THAST0 | ASTPWR#n01 | ASTPWR#n11 | ... | ASTPWR#n191 |
| . | . | . | . | . |
| . | . | . | . | . |
| . | . | . | . | . |
| THAST10 | ASTPWR#n010 | ASTPWR#N110 | ... | ASTPWR#n1910 |

An ASTPWR map prepared according to speeds of an engine and a vehicle is used for the continuously variable (CVT) type automatic transmission 3.

A current temperature of a catalyzer is detected (Step S22) and an assist-value correcting coefficient a is selected by referring to a table of assist-value correcting coefficients preset for catalyzer temperatures (Step S23).

The previously determined assist power value ASTPWR is multiplied by the fetched correcting coefficient a to determine an assist power-supply value corrected for the detected catalyzer temperature (Step S24). After this, a flag F·AST is set to 1 to indicate that an assist-value has been decided (Step S25).

Figure 5:
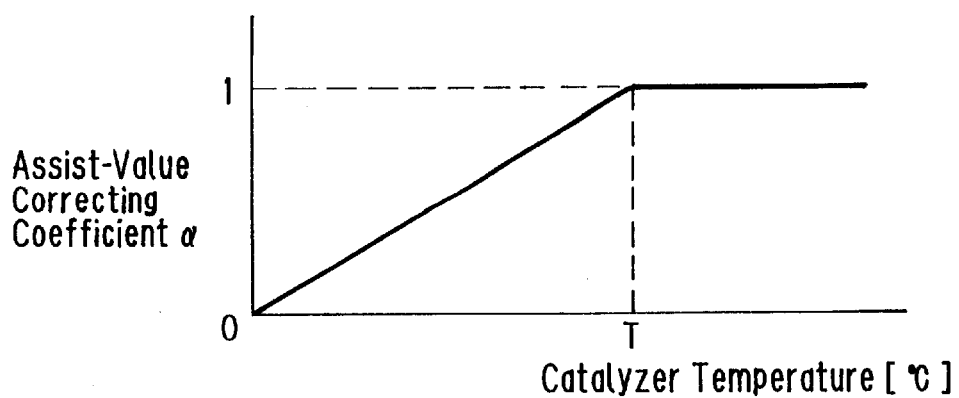
FIG. 5 shows a characteristic curve of coefficients for correcting an assist power value according to a catalyzer temperature, which data is set in a table of assist coefficients.

FIG. 5 is a graph showing a characteristic of assist-value correcting coefficients preset for catalyzer temperatures in an assist-value correcting coefficient table.

The assist-value correcting coefficient $\alpha$ being equal to 1 is applied when the catalyzer temperature is equal to or higher than a specified temperature (e.g., 450° C.). This means that the predetermined assist power value ASTPWR may not be reduced because the catalyzer is active at that temperature.

According to the present invention, it is also provided that the control unit ECU7 nullifies the predetermined assist power value ASTPWR if an engine temperature detected for example by measuring the temperature of its cooling water is lower than a specified temperature. This is not to drive the assist motor for helping the engine 1 so that the catalyzer can be promptly heated up to the temperature at which it becomes active.

According to the present invention, the control unit ECU7 also includes means for preventing the idling engine from being cut off even in the idling-stop mode if a detected temperature of the catalyzer is lower than the specified temperature.

Figure 6:
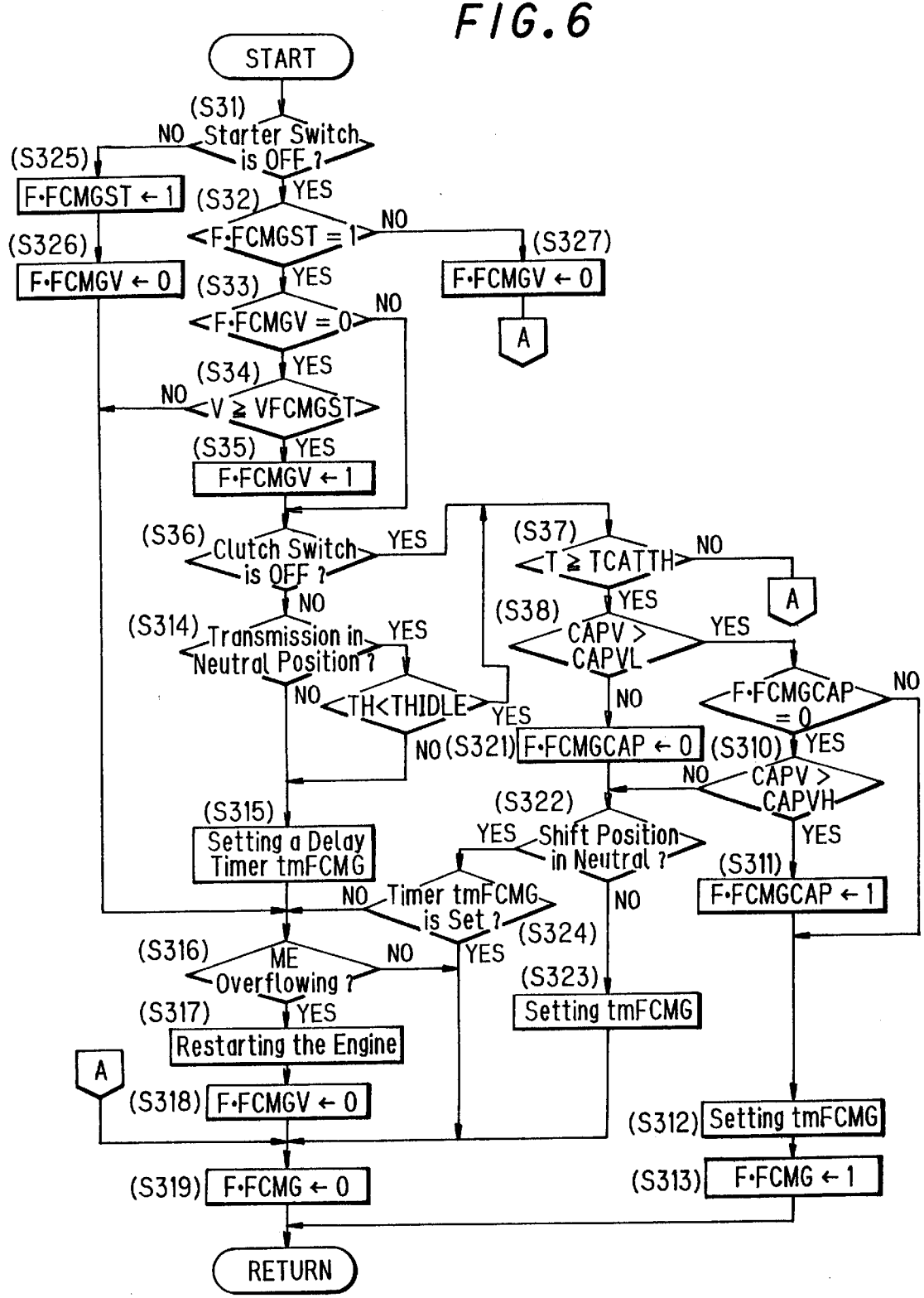
FIG. 6 is a flowchart depicting the processing of cutting off an idling engine and prohibiting cutoff of the engine when a catalyzer temperature is lower than a specified value.

FIG. 6 is a flowchart depicting a procedure for prohibiting the engine to stop in the idling-stop mode of the vehicle with a manual transmission 3 when a catalyzer temperature is lower than the specified value. In this instance, it is normally conducted that the engine will be stopped in an idling state after deceleration with cutoff of fuel and, then, be started again in the clutch-ON and ingear state. The possibility of restarting the engine and increasing the 12-bolt power consumption is discriminated by examining a capacitor voltage of the accumulator 5.

The control unit ECU7 examines whether the starter switch is in the OFF position (Step S31). If so, the control unit discriminates whether a flag F·FCMGT is set in the state <1> indicating the starter switch has been turned ON (Step S32).

Under the condition that the starter switch is in the ON position and the flag F·FCMGT is set in the state <1>, i.e., the engine is in the starting state, the control unit ECU7 examines whether a speed level-flag F·FCMGV is in the state <0> (Step S33). With the flag being in the state <0>, the control unit examines whether the detected speed V of the vehicle is greater than a preset threshold value VFCMGST (e.g., 15 km/h) (Step S34). The judgment result is used to decide that the engine idling may not be stopped when the vehicle is driven at a low speed of less than 15 km/h.

If V≧VFCMGST, the control unit sets the speed-level flag F·FCMGV in the state <1> (Step S35) and, then, examines whether the clutch switch has been turned OFF (to operate the clutch) (Step S36).

With the speed-level flag F found in the state <1> at Step S33, the control unit ECU7 skips Step S34 for judging whether the vehicle speed V exceeds the preset threshold value (e.g., 15 km/h) and proceeds to Step S36 to see whether the clutch switch is in the OFF position (to operate the clutch).

With the clutch switch being in the OFF position (i.e., with the clutch being in operation), the control unit examines whether a concurrently detected catalyzer temperature T is equal to or higher than a threshold TCATTH (e.g., 350° C.) preset for judging the need for stopping the engine (Step S37).

If T≧TCATTH, the control unit ECU7 examines whether the capacitor voltage CAPV of the accumulator 5 is higher than a low level CAPVL of the voltage necessary for restarting the engine (Step S38). If CAPV>CAPVL, then the control unit examines whether a voltage level flag F·FCMGCAP is set to zero (Step S39). If so, the control unit examines whether the capacitor voltage CAPV is higher than a high level CAPVH of the voltage, which corresponds to the full charged level of the capacitor of the accumulator (Step S310).

In the condition of CAP>CAPVH, the control unit sets the voltage level flag F·FCMGCAP in the state <1> (Step S311) and, then, sets a specified delay time of the engine restart on a timer tmFGMG (Step S312). After this, an engine stop flag F·FCMG is set to 1 (Step S313) to carry out stopping of the idling engine.

With the voltage-level flag F·FCMGCAP found in the state <1> at Step S39, the control unit directly proceeds to Step S312 to set the engine-restart-delay timer tmFCMG.

With the clutch switch found in the ON position (the clutch being cut off) at Step S36, the control unit examines whether the transmission 3 is in the neutral position (Step S314). If the transmission being out of the neutral position (i.e., the ingear state), the timer tmFGMG is set to the specified delay time before restarting the engine (Step S315) and, then, examines whether ME is in the <overflow> state indicating the engine being cut off (Step S316).

The engine is considered to be in the cut-off state when the ME is overflowing. Now, the engine is restarted (Step S317). The control unit sets the vehicle speed-level flag F·FCMGV to zero (Step S318) and the engine-stop flag F·FCMG to zero (Step S319). If the ME is not in the overflow state, the control unit directly proceeds to Step S319 to set the engine-stop flag F·FCMG to zero.

In this instance, the engine is allowed to restart only under the condition that the transmission is set in the neutral position until a time (e.g., 2 seconds) preset on the engine-restart delay timer tmFCMG elapses.

With the transmission 3 found in the neutral position at Step S314, the control unit examines whether a concurrently detected value of the throttle opening degree TH is smaller than a full-closed throttle value for idling THIDL (Step S320). If so (i.e., TH<THIDLE), the control unit proceeds to Step S37 to see whether the catalyzer temperature is equal to or higher than the threshold temperature. If not (i.e., TH≧THIDLE), it proceeds to Step S315 to set the engine-restart delay timer tmFCMG.

If CAPV s CAPVL at Step S38, the control unit sets the capacitor-voltage-level flag F·FCMGCAP to zero (Step S321) and, then, examines whether the transmission is put in the neutral position (Step S322).

If CPV≧CAPVH at Step S310, the control unit proceeds to Step S322 to see whether the transmission is placed in the neutral position.

If the transmission is out of the neutral position (i.e., the transmission is in the ingear state), the control unit sets the engine-restart delay timer tmFCMG (Step S323) and, then, proceeds to Step S319 to set the engine-stop flag F·FCMG to zero. With the transmission being in the neutral position, the control unit examines whether the engine-restart delay timer tmFCMG is set (Step S324). If so, the control unit proceeds to Step S319 to set the engine-stop flag F·FCMG to zero. If not, the control unit proceeds to Step S316 to see whether the ME is in the overflow state.

When the starter switch is in the ON-position at Step S31, the control unit ECU7 sets a starter-ON-OFF flag F·FCMGST to 1 (Step S325) and the speed-level flag F·FCMGV to zero (Step S326) and, then, proceeds to Step S316 to see whether the ME is overflowing.

If V<VFCMGST at Step S34, the control unit proceeds to Step S316 to see whether the ME is overflowing.

When the starter-switch ON-OFF flag F·FCMGST is found in the state <zero> at Step S32, the control unit sets the speed-level flag F·FCMGV to zero (Step S327) and, then, proceeds to Step S319 to set the engine-stop flag F·FCMG to zero.

As is apparent from the foregoing, the control device according to the present invention, which is used for a hybrid vehicle powered by a combination of an engine and an assist motor which is controlled for assisting the engine by supplying an assist electric power in an amount predetermined according to current running conditions when accelerating the vehicle and which is further detects a current temperature of a catalyzer device and corrects the predetermined assist power-supply value according to the detected catalyzer temperature so that the catalyzer device, even if being at a low temperature, may be quickly heated up to the temperature necessary for activating the catalyzer therein.

The control device according to another aspect of the present invention, which is used for a hybrid vehicle powered by a combination of an engine and an assist motor and which detects a current temperature of a catalyzer device and prohibits the idling engine from stopping at a low temperature of the catalyzer device so that the catalyzer device may be quickly heated up to the temperature necessary for activating the catalyzer therein.

What is claimed is:

1. A control device for a hybrid vehicle including an engine, a catalyzer device, and an assist motor for supplying electric power to the engine based on running conditions of the vehicle, said control device comprising:
   means for detecting a current electric power based on current running conditions of the vehicle;
   means for detecting a temperature of the catalyzer device;
   means for selecting an electric power correcting coefficient based on the detected temperature of the catalyzer device;
   means for determining a correcting electric power based on a product of the current electric power and the electric power correcting coefficient; and means for detecting a temperature of the engine and preventing the assist motor from assisting the engine when the detected temperature of the engine is not higher than a specified temperature.

2. A control device for a hybrid vehicle including an engine, a catalyzer device, and an assist motor for supplying electric power to the engine based on running conditions of the vehicle, said control device comprising:

means for detecting a current electric power based on current running conditions of the vehicle;

means for detecting a temperature of the catalyzer device;

means for selecting an electric power correcting coefficient based on the detected temperature of the catalyzer device;

means for determining a correcting electric power based on a product of the current electric power and the electric power correcting coefficient; and means for detecting the vehicle in an idling state and cutting off the engine but prohibits the means from cutting off the engine if the detected temperature of the catalyzer device is not higher than a specified temperature.

3. A control device for a hybrid vehicle including an engine, a catalyzer device, and an assist motor for supplying electric power to the engine based on running conditions of the vehicle, said control device comprising:

means for detecting a current electric power based on current running conditions of the vehicle;

means for detecting a temperature of the catalyzer device;

means for selecting an electric power correcting coefficient based on the detected temperature of the catalyzer device; and means for determining a correcting electric power based on a product of the current electric power and the electric power correcting coefficient, wherein the correcting electric power is controlled in a way that the correcting electric power decreases as the temperature of the catalyzer device decreases, and does not decrease when the temperature of the catalyzer device is higher than a specified value at which the catalyzer device is activated.

* * * * *